April 1, 1958 A. W. MASSMAN 2,829,304

TELEVISION RECEIVER SIZE CONTROL

Filed June 26, 1953

INVENTOR.
ALBERT W. MASSMAN
BY
Norman L. Mueller
ATTY.

United States Patent Office 2,829,304

Patented Apr. 1, 1958

2,829,304

TELEVISION RECEIVER SIZE CONTROL

Albert W. Massman, Wheaton, Ill., assignor to Motorola, Inc., Chicago, Ill., a corporation of Illinois Application June 26, 1953, Serial No. 364,438

2 Claims. (Cl. 315—27)

The present invention relates to television receivers and more particularly to an improved and simplified arrangement for controlling the size of at least one dimension of the image reproduced by the television receiver.

Most present day receivers incorporate suitable manual controls for adjusting the height and width of the image reproduced by the reproducing device of the receiver. The width control is usual in the form of a variable inductance coil connected in the output circuit of the horizontal deflection system associated with the reproducing device. By means of such a variable inductance coil, it is possible to control manually the horizontal size of the reproduced image without influencing materially the high voltage which is also derived from the horizontal deflecting system. This high voltage is applied to the accelerating electrode of the image reproducing device to provide an accelerating field for the cathode ray beam therein and the voltage should have a constant value. Such prior arrangements using variable inductance coils to provide a width, or horizontal size, control have been found to be satisfactory but are relatively expensive.

It is, accordingly, an object of the present invention to provide an improved and simplified device that may be incorporated in the horizontal or vertical deflection system of a television receiver for controlling the horizontal or vertical size of the reproduced image and which, when included in the horizontal deflection system, does not affect materially the high voltage developed by the horizontal deflection system.

Another object of the invention is to provide such an improved size control that is relatively inexpensive and which can be mounted in a simple and convenient manner in a television receiver.

A feature of the present invention is the provision in a television receiver of an output transformer in either the line or field deflection systems of the receiver with a magnetic core having an air gap therein and a metallic member extending into the air gap so that eddy currents are induced in the member. These eddy currents effectively vary the reluctance path in the transformer and, hence, the coupling between the windings. The member is mounted to be movable in the air gap thereby to control either the horizontal or vertical size of the reproduced image.

The above and other features of the invention which are believed to be new are set forth with particularity in the appended claims. The invention itself, however, together with further objects and advantages thereof, may best be understood by reference to the following description when taken in conjunction with the accompanying drawing in which:

Figures 1, 2, 3:
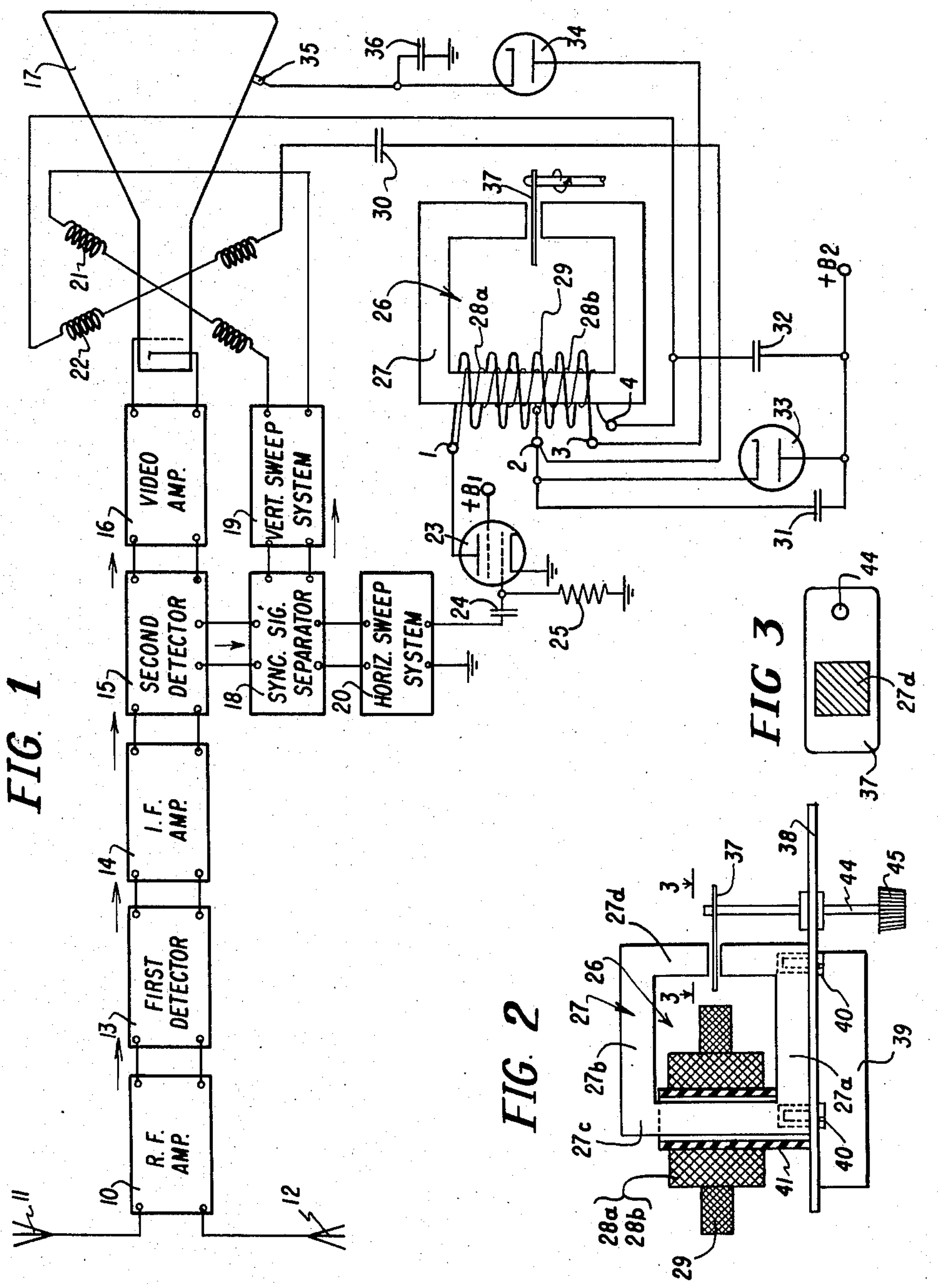
Figure 1 shows a television receiver incorporating the invention.
Figure 2 is a mechanical representation of one embodiment of the invention.
Figure 3 is a sectional view of the embodiment taken along the lines 3—3 of Figure 2.

The invention provides a transformer assembly for use in a circuit for providing beam deflecting current for a cathode ray tube. The assembly comprises a magnetic core having an air gap therein with windings disposed on the core and inductively coupled one to another. A metallic conducting member is mounted adjacent to the core and extends into the air gap. The metallic member is movable relative to the air gap effectively to control the reluctance path of the core. In this manner, the inductive coupling between the windings is controlled which, in turn, controls the size of the reproduced image.

The television receiver of Figure 1 includes a radio frequency amplifier 10 having input terminals connected to an appropriate antenna circuit 11, 12 and output terminals connected through a first detector 13 to an intermediate frequency amplifier 14. Intermediate frequency amplifier 14 is coupled to a second detector 15 which, in turn, is coupled through a video amplifier 16 to the input electrode of a cathode ray image reproducing device 17.

Second detector 16 is also coupled to a synchronizing signal separator 18 which has output terminals connected to a vertical sweep system 19 and to a horizontal sweep system 20. The output terminals of vertical sweep system 19 are connected to the vertical deflection coils 21 of reproducing device 17 and the output terminals of horizontal sweep system 20 are connected to the horizontal deflection coils 22 of the reproducing device through an output circuit which is to be described in detail.

When the receiver is tuned to a television signal intercepted by antenna circuit 11, 12, such signal is amplified by radio frequency amplifier 10. The amplified signal is heretodyned in first detector 13 to the selected intermediate frequency of the receiver, and the resulting intermediate frequency signal is amplified in intermediate frequency amplifier 14 and applied to second detector 15. Second detector 15 demodulates the intermediate frequency and produces a composite video signal which includes video components, and which also includes vertical and horizontal synchronizing components. The composite video signal is amplified in video amplifier 16 applied to the input electrode of reproducing device 17 to control the intensity of the cathode ray beam therein in accordance with the video intelligence.

The synchronizing components of the composite video signal are separated from the signal in separator 18, the vertical synchronizing components being used to synchronize vertical sweep system 19 and the horizontal synchronizing components being used to synchronize horizontal sweep system 20. In this manner, the horizontal and vertical sweep systems deflect the cathode ray beam in the reproducing device in synchronism with the received television signal.

In the manner described above, the television receiver reproduces the televised information on the screen of image reproducing device 17. The sound portion of the television receiver forms no part of the present invention and, for that reason, has not been shown.

The present invention is directed particularly to a size control device that may conveniently be included in the output circuit of the horizontal deflection system and which will be described in conjunction with that circuit.

There is no reason, however, why a similar arrangement could not be incorporated into the vertical sweep system to control the vertical size of the reproduced images.

One of the output terminals of horizontal sweep system 20 is coupled to the control electrode of an electron discharge amplifier device 23 through a coupling capacitor 24. The control electrode is connected to ground through a grid-leak resistor 25. The other output terminal of the horizontal sweep system is connected to ground. Device 23 functions as an output amplifier for the horizontal deflection sawtooth voltage signal developed by the horizontal sweep system, and the device includes a cathode connected to ground, a screen electrode connected to the positive terminal $+B_1$ of a uni-directional potential source, and an anode connected to the terminal 1 of an output coupling transformer 26.

Coupling transformer 26 includes a core 27 of a suitable magnet material and which has elongated base and top sections and a pair of spaced parallel elongated side sections interconnecting the extremities of the base and top sections. A first winding **28*a* is disposed on one of the elongated side sections of core 27 and connected to terminals 1 and 2. A second winding 28*b* is also disposed on this side section and connected between terminals 2 and 4 and in series with winding 28*a*. A third winding 29 is also disposed on this side section of core 27 over windings 28*a*, 28*b*, and the third winding is connected between terminals 1 and 3 and in series with windings 28*a* and 28*b*. Transformer 26 is, therefore, connected as an auto transformer with windings 28*a*, 28*b* forming the primary winding; winding 28*b* forming the sweep secondary winding, and windings 28*a*, 28*b* and 29 forming the high voltage secondary of the transformer. The other side section of core 27** has an air gap extending therethrough of selected dimensions to provide the maximum desired size for the reproduced image.

The anode of device 23 is connected to the positive terminal $+B_2$ through primary windings **28*a*, 28*b* and through a capacitor 32. The horizontal deflection coils 22 of device 17 are connected across sweep secondary winding 28*b* through a capacitor 30 and terminals 2 and 4. A damper diode 33 has its anode directly connected to the positive terminal $+B_2$ and its cathode connected to terminal 2 (the common junction of winding 28*a*, 28*b*). Diode 33 is bridged by a capacitor 31. Accelerating voltage is supplied to terminal 35 of reproducing device 17 through a diode rectifier 34, the anode of this device being connected to terminal 3 and the cathode being coupled to ground through capacitor 36**.

The above described output circuit merely represents a typical circuit to which the present invention may be applied and, in itself, forms no part of the present invention. The operation of the output circuit briefly is as follows:

Sweep system 20 develops a sawtooth voltage wave which is amplified in device 23 to produce a sawtoothed current wave in primary windings **28*a*, 28*b*. The sawtooth current wave in the primary windings is stepped up in sweep secondary winding 28*b* by well known auto transformer action and the stepped-up sawtooth current wave is supplied to the horizontal deflection coils 22 coupled across this secondary. Damper diode 33 performs a well known function in damping oscillations in the output circuit and is also instrumental in developing a bootstrap voltage across capacitor 32, the bootstrap voltage together with the voltage of positive terminal $+B_2$ are supplied to the anode of device 23 through primary windings 28*a*, 28*b*** to provide increased excitation for the device.

During horizontal retrace intervals, voltage pulses are developed across primary windings **28*a*, 28*b* and these are induced in the high voltage secondary windings 28*a*, 28*b* and 29 and rectified by diode device 34. Device 34, in conjunction with capacitor 36, develops a high voltage uni-directional accelerating potential for reproducing device 17**.

In accordance with the invention, a metallic electrically conductive member 37 is rotatably mounted adjacent core 27 and extends into the air gap in the side section of the core. The metallic member may be composed of any suitable electrically conductive material such as brass or copper. The member 39 is eccentrically mounted on a rotatable shaft so that it can be moved relative to the air gap. The insertion of the metallic member in the air gap produces eddy currents in the member which produce magnetic fields that oppose the fields in the core 27 and effectively vary the reluctance of the magnetic path through the core. Movement of the member varies these effects and, therefore, the inductive coupling, between the primary and secondary windings of transformer 26. This varies the amplitude of the sweep signal in deflection coil 22 and results in a variation of the horizontal size of the image reproduced by device 17.

A suitable mounting arrangement for transformer 26 and member 37 is shown in Figure 2. The magnetic core 27 of the transformer is mounted on a suitable mounting plate 38 which, in turn, is mounted in the television receiver on a bracket 39. The core 27 is affixed to the mounting plate by a pair of screws 40 threaded through the plate into the core. These screws secure the core to the mounting plate with the elongated base section **27*a* of the core extending along the mounting plate, the elongated top section 27*b* extending in spaced parallel relation to the mounting plate, and the respective elongated side sections 27*c* and 27*d* extending perpendicularly upward from the mounting plate and interconnecting the extremities of the base and top members. The core 27 may be constructed in any well known manner and it is believed that a further explanation of the details thereof are unnecessary herein. As previously stated, side section 27*d*** has an air gap extending therethrough as shown.

Side member **27*c* of the core has a tubular mounting member 41 of insulating material disposed thereon, and member 41 carries windings 28*a*, 28*b* previously referred to in conjunction with Figure 1. Winding 29 is disposed on the windinggs 28*a*, 28*b*** (as shown).

A control shaft 44 is rotatably mounted in plate 38 and extends upwardly adjacent side section **27*d* of core 27. The control shaft has a control knob 45 affixed to its lower extremity. Metallic member 37 is eccentrically mounted on shaft 44 (as shown in Figure 3) and rotation of the shaft causes the metallic member to be inserted to a greater or lesser degree in the air gap in side section 27*d***. In this manner the reluctance of the magnetic path of the transformer may effectively be varied which, in turn, varies the coupling between the windings and controls the horizontal size of the reproduced image.

The effective control of the reluctance of the magnetic path of the transformer in the manner described above has been found to have a much greater effect on the inductive coupling between primary windings **28*a*, 28*b* and sweep secondary winding 28*b*** than it has on the inductive coupling between the primary windings and the high voltage secondary. Because of this, the device is suitable to control the horizontal size of the reproduced image and yet has no material effect on the high voltage developed by the horizontal deflection system. Therefore, the invention provides a simple and convenient control for the size of the reproduced image which does not affect the accelerating potential supplied to the reproducing device to any appreciable extent.

It is to be noted that the arrangement in Figures 2 and 3 is merely a suitable arrangement for controlling the metallic member 37 and is not intended to limit the invention in any way. The metallic member may be mounted and moved in any suitable manner and with any degree of motion relative to the air gap in core 27, its only function being effectively to vary the reluctance of the magnetic path of the transformer for the purposes described.

The invention provides, therefore, an exceedingly simple and inexpensive arrangement that may be conveniently incorporated into the deflection system of a television receiver to provide a manual control for the size of the reproduced image. As previously stated, the device has been described as incorporated into the horizontal deflection system of the receiver in which it finds its greatest utility. However, a similar arrangement could be incorporated in the vertical deflection system of the receiver in conjunction with the vertical output transformer size of the reproduced image.

While a particular embodiment of the invention has been shown and described, modifications may be made and it is intended in the appended claims to cover all such modifications as fall within the true spirit and scope of the invention.

I claim:

1. In a television sweep system for providing beam deflecting current and beam accelerating voltage for a cathode ray tube, and which includes an amplifier for the deflecting current, a transformer assembly including in combination, a magnetic core formed of an elongated base member, an elongated top member in spaced relation with said base member, and a pair of spaced elongated side members interconnecting the respective extremities of said base and top members; said core having an air gap therein extending across one of said side members; a first winding disposed on the other of said side members, a second winding disposed on said other of said side members adjacent said first winding and connected in series therewith, and a third winding disposed on said other of said side members over said first and second windings and connected in series with said first winding, said first and second windings in series forming the primary of the transformer and being adapted to be connected to the amplifier, said second winding forming a first secondary of said transformer for supplying beam deflection current to the cathode ray tube, and said first and second and third windings forming a second secondary for said transformer for supplying beam accelerating voltage to the cathode ray tube; and an electrically conductive member adapted to be movable in said air gap to vary the reluctance of the magnetic path through said core and adjust the amplitude of the beam deflection current supplied to the cathode ray tube.

2. In a television sweep system for providing beam deflecting current and beam accelerating voltage for a cathode ray tube, and which includes an amplifier for the deflecting current, a transformer assembly including in combination, a magnetic core formed of an elongated base member, an elongated top member in spaced parallel relation with said base member, and a pair of spaced parallel elongated side members interconnecting the respective extremities of said base and top members; said core having an air gap therein extending across one of said side members; a first winding disposed on the other of said side members, a second winding disposed on said other of said side members adjacent said first winding and connected to one end of said first winding, and a third winding disposed on said other of said side members over said first and second windings and connected to the other end of said first winding, said first and second windings in series forming the primary of the transformer and being adapted to be connected to the amplifier, said second winding forming a first secondary of said transformer for supplying beam deflection current to the cathode ray tube, and said first and second and third windings forming a second secondary for said transformer for supplying beam accelerating voltage to the cathode-ray tube; a rotatable control shaft supported adjacent said air gap; and a metallic electrically conductive plate eccentrically mounted on said control shaft and extending into said air gap to control the reluctance of the magnetic path through said core and adjust the amplitude of the beam deflection current supplied to the cathode ray tube.

References Cited in the file of this patent

UNITED STATES PATENTS

| | | |
|---|---|---|
| 400,515 | Thomson | Apr. 2, 1889 |
| 2,641,697 | Schurr | June 9, 1953 |
| 2,644,104 | Fyler et al. | June 30, 1953 |
| 2,665,393 | Bocciarelli | Jan. 5, 1954 |

FOREIGN PATENTS

| | | |
|---|---|---|
| 14,427 | Australia | Sept. 22, 1933 |

OTHER REFERENCES

Serial No. 299,393, Bergtold (A. P. C.), published May 18, 1943.